United States Patent

[11] 3,586,823

| [72] | Inventor | Jacques Schier<br>Deerfield, Ill. |
|---|---|---|
| [21] | Appl. No. | 881,659 |
| [22] | Filed | Dec. 3, 1969 |
| [45] | Patented | June 22, 1971 |
| [73] | Assignee | Martin-Brower Corporation<br>Chicago, Ill. |

[54] COMBINATION OF AN ELECTRICAL RADIANT FOOD WARMING AND ILLUMINATING GRAPHIC DISPLAY APPARATUS
3 Claims, 10 Drawing Figs.

[52] U.S. Cl. .................................................. 219/347,
219/214, 219/354, 219/405, 219/411, 219/553,
99/401
[51] Int. Cl. .................................................. F24h 9/02,
H05b 3/40
[50] Field of Search .................................... 219/405,
403, 411, 432, 436, 347, 349, 354, 553; 99/401,
447

[56] References Cited
UNITED STATES PATENTS

| 2,708,708 | 5/1955 | Ronsch | 219/405 X |
| 2,860,225 | 11/1958 | Steen | 219/411 X |
| 2,863,979 | 12/1958 | Fitzgerald | 219/403 X |
| 3,120,599 | 2/1964 | Hilgers | 219/214 X |
| 3,161,755 | 12/1964 | Tilus | 219/403 |
| 3,244,859 | 4/1966 | Whiteford | 219/348 |

Primary Examiner—Volodymyr Y. Mayewsky
Attorney—Kegan, Kegan & Berkman

ABSTRACT: An apparatus for maintaining food at an elevated temperature and for simultaneously illuminating a graphic transparency containing decorative or advertising material. An electric lamp which supplies heat to food, serves as well to illuminate the transparency. The apparatus includes a corrugated rack for supporting the food units to be maintained heated.

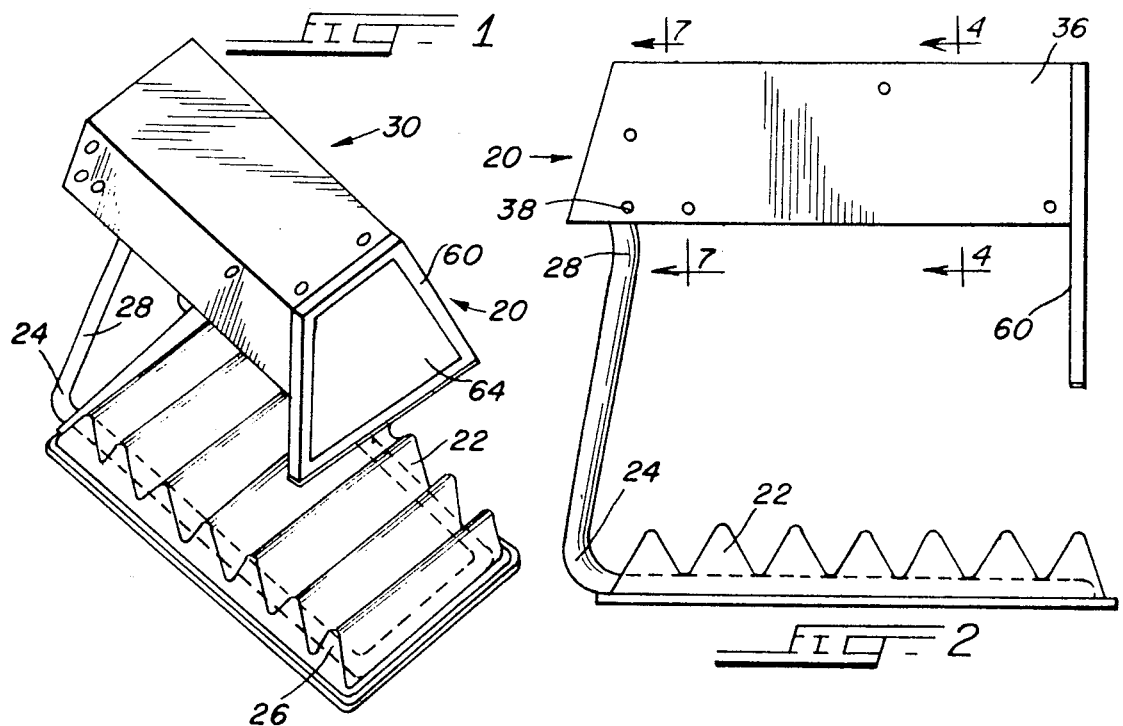
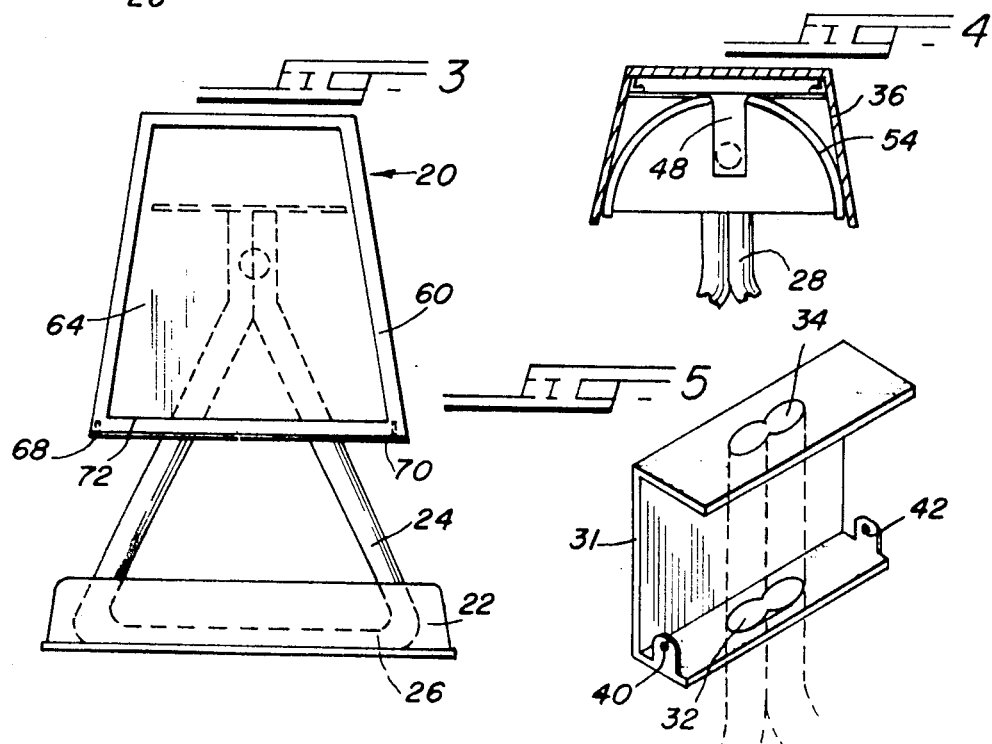

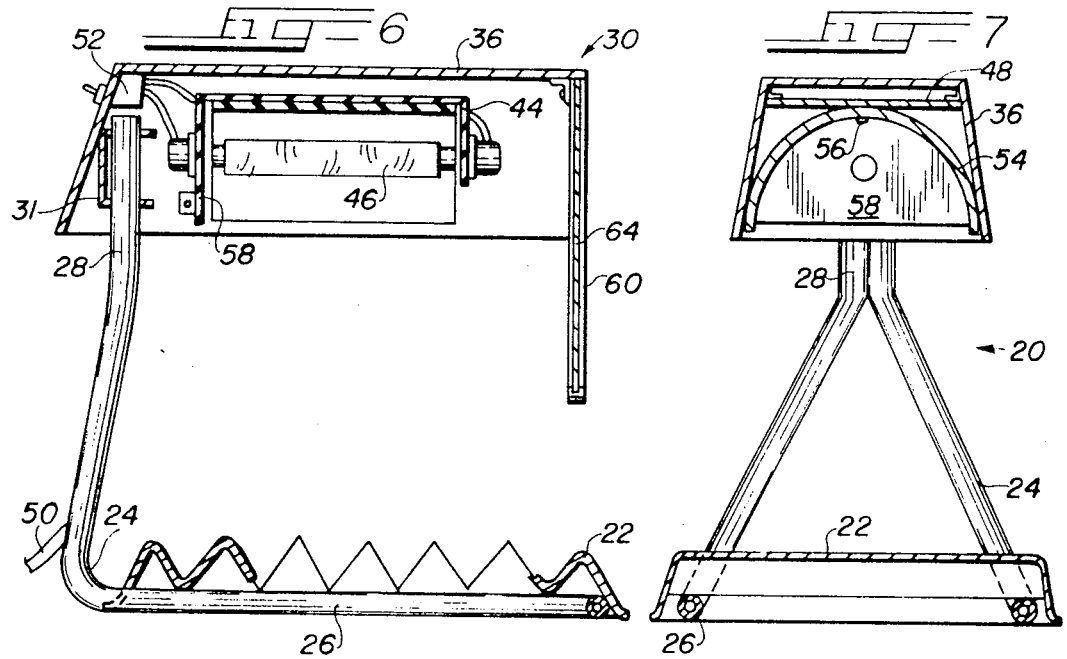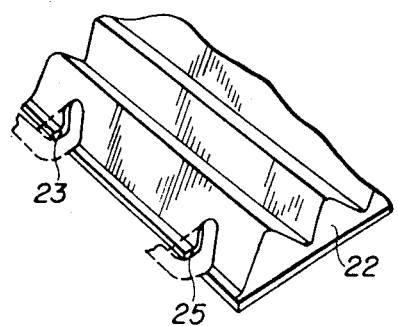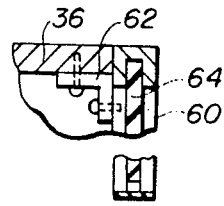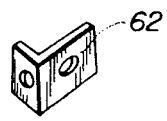

3,586,823

COMBINATION OF AN ELECTRICAL RADIANT FOOD WARMING AND ILLUMINATING GRAPHIC DISPLAY APPARATUS

This application relates to an improvement in food warmers and advertising display devices. More specifically, it is directed to a device for displaying and for promoting the sale of food, and for maintaining the food at an elevated temperature after preparation and prior to the time it is served or sold in restaurants, drive-ins, and similar establishments.

Devices for keeping foods warm prior to service or sale are well known in the art. However, heretofore, such devices have suffered from one to more disadvantages which have presented their maximum utilization.

It is an object of this invention to provide a food warmer for efficiently maintaining foods at an elevated temperature, and for attractively displaying advertising matter, pictures or pictorial representations of the food, promotional material, or other decorative graphics.

It is a further object of this invention to provide a food warming apparatus which is easy to operate and maintain in sanitary condition, and which provides for the orderly placement of food for warming.

A feature of this invention is a frame for holding a graphic transparency whereby it is illuminated by the electric lamp which serves also as the source of radiant heat for the food.

These and other objects and advantages of the invention will become apparent from a reading of the following specification taken in conjunction with the drawings.

Referring generally to the drawings, FIG. 1 is a perspective view of a preferred embodiment of the apparatus of the invention incorporating the features thereof, including a food rack, a visual display, and a heat and light source.

FIG. 2 is a side elevational view of the apparatus. FIG. 3 is a front elevational view of the apparatus showing the transparency, transparency frame, and the supporting stand.

FIG. 4 is a front view of the lamp fixture with the transparency holding frame removed, showing the hood and the first reflector.

FIG. 5 is a perspective view of the collar which attaches the lamp fixture to the supporting stand.

FIG. 6 is a side cross-sectional view of the apparatus taken along line 6–6 of FIG. 2.

FIG. 7 is a cross-sectional view of the apparatus taken along lines 7–7 of FIG. 2.

FIG. 8 is a perspective view of the rear portion of the food holding rack.

FIG. 9 is a detailed view of the means for securing the transparency frame to the hood.

FIG. 10 is a perspective view of the angle bracket shown in FIG. 9.

Referring more specifically to FIGS. 1 through 5, there is shown a food warming apparatus 20 having a food holding rack or tray 22 which is mounted on a supporting stand 24. The stand consists of a U-shaped horizontal base 26 of metal tubing which is bent to project upwardly at its rear portion to define a pair of arms which converge and terminate in an upstanding neck 28. A light fixture 30 is mounted on the neck 28 by means of a collar 31 which is shown in detail in FIG. 5, and the collar 31 is provided with through-openings 32 and 34 which slide over the neck 28. A hood 36 of metal, plastic, wood, or similar material is attached to the collar 31 by means of rivets or screws 38 which engage flanges 40 and 42 of the collar 31, thereby supporting the hood on the neck 28 of the supporting stand 24.

A mounting socket 44 for an electric lamp 46 is affixed to the inside of the hood 30 by means of a bracket 48 shown in FIG. 6. The electric lamp utilized in this embodiment of the invention is a tubular quartz infrared lamp having a 115 to 125 volt class C filament and an overall length of 8 13/16 inches. A General Electric lamp No. 500T 3/7 is suitable for use in this apparatus. Electric current is supplied to the lamp 46 through a power cord 50 which enters through an opening in the rear of the tubular stand 24 and exits from an end of one of the metal tubes to an ON-OFF switch 52.

An arcuate or first metallic reflector 54 which is generally semicircular or parabolic in cross section is mounted inside the hood 36 over the lamp 46 so as to concentrate and direct evenly distributed radiant energy from the lamp downwardly toward the food holding rack 22, so as to maintain food in the rack at a uniformly elevated temperature. The reflector 54 is attached to the bracket 48 by means of one or more rivets or screws 56.

A second metallic reflector 58 which is generally flat is mounted vertically behind the bulb 46 so as to reflect or direct radiant energy laterally, and forward through the transparency.

A transparency holding frame 60 is mounted on the front of the hood 36 by means of angle brackets 62 shown in FIGS. 9 and 10. The frame 60 extends downwardly from the top of the hood 36 to a point considerably lower than the lamp fixture 30. In the embodiment of the invention shown, the frame 60 is trapezoidal in shape, but it may have any desired configuration, provided that it is within the area of illumination of the lamp.

The transparency 64 is shown in FIG. 9 mounted in the frame 60, and may be paper, film, plastic or any translucent material but unduly sensitive to heat. Graphic material which is effective to promote impulse purchases, such as pictures of the food being sold, may be utilized in the transparency and will be illuminated by the radiant energy of the lamp 46 which consists of both infrared and visible light. The transparency 64 may be quickly and easily changed or replaced by unscrewing screws 68 and 70 in the lower section 72 of the frame 60, removing said section 72, removing the old transparency and inserting a new transparency.

The food holding tray or rack 22 is made of a heat resistant plastic preferably composed of a combination of acrylonitrile, butadiene, and styrene, sold under the trademark Royalite 12. The corrugated structure aids in the orderly placement of units of prepared food, and the corrugations deter dissipation of heat from the food by obstructing convection currents. The rear portion of the rack 22 as shown in FIG. 8 has slots 23 and 25 cut therein to accommodate the supporting stand 24. The rack 22 is easily removable for washing and is not subject to corrosion.

While the disclosure of this invention describes the preferred embodiment, it is evident that the invention is not limited thereto, and that numerous modifications, changes and variations can be made without departing from the essential spirit of the underlying principles of the invention. It is, therefore, intended by the following claims to include within the scope of the invention all such variations and modifications by which substantially the results of this invention may be obtained through the use of substantially the same or equivalent means.

What I claim is:

1. An apparatus for maintaining units of precooked food at an elevated temperature prior to sale and for displaying illuminated graphic advertising and sales promoting material, said apparatus comprising;

generally horizontally disposed tray means for supporting food units to be heated;

a radiant energy supply electric lamp providing both heat and light energy;

frame means supporting said radiant energy supply electric lamp to overlie said tray;

holder means connected to said frame means and adapted to carry a graphic transparency to depend from said frame means;

first reflector means for directing thermal energy from said radiant energy supply uniformly downwardly onto said tray to provide substantially equal heating over an entire expanse of said tray;

second reflector means for directing light energy laterally to illuminate said transparency; and said first reflector means is a downwardly facing arcuate reflector mounted above said radiant energy supply electric lamp, and said second reflector means is a forwardly facing reflector mounted behind said radiant energy supply electric lamp.

2. The apparatus set forth in claim 1 wherein said radiant energy supply electric lamp is a tubular quartz infrared electric lamp.

3. The apparatus set forth in claim 1 wherein said tray means is a corrugated tray.

UNITED STATES PATENT OFFICE
CERTIFICATE OF CORRECTION

Patent No. 3,586,823      Dated June 22, 1971

Inventor(s) Jacques Schier

It is certified that error appears in the above-identified patent and that said Letters Patent are hereby corrected as shown below:

Column 2, line 23, "but" should read -- not --; line 72, after "and" insert -- wherein --.

Signed and sealed this 11th day of April 1972.

(SEAL)
Attest:

EDWARD M. FLETCHER, JR.
Attesting Officer

ROBERT GOTTSCHALK
Commissioner of Patents